United States Patent
Waltermann et al.

(10) Patent No.: US 7,818,567 B2
(45) Date of Patent: Oct. 19, 2010

(54) METHOD FOR PROTECTING SECURITY ACCOUNTS MANAGER (SAM) FILES WITHIN WINDOWS OPERATING SYSTEMS

(75) Inventors: Rod D. Waltermann, Rougemont, NC (US); David C. Challener, Raleigh, NC (US); Philip L. Childs, Raleigh, NC (US); Norman A. Dion, II, Cary, NC (US); James Hunt, Chapel Hill, NC (US); Nathan J. Peterson, Raleigh, NC (US); David Rivera, Durham, NC (US); Randall S. Springfield, Chapel Hill, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1057 days.

(21) Appl. No.: 11/535,542

(22) Filed: Sep. 27, 2006

(65) Prior Publication Data
US 2008/0076355 A1    Mar. 27, 2008

(51) Int. Cl.
*H04L 29/06* (2006.01)
(52) U.S. Cl. .................................... 713/165
(58) Field of Classification Search .......... 713/165, 713/189, 190, 193
See application file for complete search history.

(56) References Cited

U.S. PATENT DOCUMENTS 7,380,136 B2* 5/2008 Zimmer et al. ............. 713/193
2003/0188179 A1* 10/2003 Challener et al. ........... 713/193

OTHER PUBLICATIONS

Roberta Bragg, Protecting the SAM with Syskey, infomIT.*

* cited by examiner

*Primary Examiner*—Emmanuel L Moise
*Assistant Examiner*—Ali S Abyaneh
(74) *Attorney, Agent, or Firm*—Antony P. Ng; Dillon & Yudell, LLP

(57) ABSTRACT

A method for protecting Security Accounts Manager (SAM) files within a Windows® operating system is disclosed. A SAM file encryption key is generated by encrypting a SAM file via a syskey utility provided within the Windows® operating system. The SAM file encryption key is then stored in a virtual floppy disk by selecting an option to store SAM file encryption key to a floppy disk under the syskey utility. A blob is generated by performing a Trusted Platform Module (TPM) Seal command against the SAM file encryption key along with a value stored in a Performance Control Register and a TPM Storage Root Key. The blob is stored in a non-volatile storage area of a computer.

12 Claims, 4 Drawing Sheets

METHOD FOR PROTECTING SECURITY ACCOUNTS MANAGER (SAM) FILES WITHIN WINDOWS OPERATING SYSTEMS

BACKGROUND OF THE INVENTION

1. Technical Field

The present invention relates to computer security in general, and, in particular, to a method for providing security management in computer systems. Still more particularly, the present invention relates to a method for protecting Security Accounts Manager (SAM) files within Windows® operating systems.

2. Description of Related Art

Within the family of Windows® operating systems manufactured by the Microsoft® Corporation, such as Windows® NT/2000/XP, a Security Accounts Manager (SAM) file is utilized to store various passwords to be applied to different user accounts within a local computer system and/or other computer systems on a computer network. If an unauthorized user can retrieve password information from a SAM file by hacking the SAM file within a computer system, the unauthorized user can access sensitive data on the computer system.

The Windows® operating system does provide a syskey utility for the encryption of SAM files, which somewhat strengthens the protection of SAM files by making them more difficult for a hacker to break. The syskey utility generates an encryption key by encrypting sensitive areas of a SAM file. The encryption key generated by the syskey utility can be either stored on a floppy disk (which is required when the Windows® operating system is being loaded during system startup) or stored in a hard drive using a "complex obfuscation algorithm" (as described by Microsoft®).

While the storage of an encryption key in a floppy disk provides additional security over the storage of the encryption key in a hard drive of a computer system, it is also less convenient because all users that share the computer system are required to have a floppy disk that contains the encryption key in order to access the computer system. In addition, multiple copies of floppy disks can increase the likelihood of the floppy disk being lost, and without the floppy disk, the owner of the floppy disk cannot access the computer system.

Consequently, it would be desirable to provide an improved method for protecting SAM files within Windows® operating systems.

SUMMARY OF THE INVENTION

In accordance with a preferred embodiment of the present invention, a SAM file encryption key is generated by encrypting a SAM file via a syskey utility provided within a Windows® operating system. The SAM file encryption key is then stored in a virtual floppy disk by selecting an option to store SAM file encryption key to a floppy disk under the syskey utility. A blob is generated by performing a Trusted Platform Module (TPM) Seal command against the SAM file encryption key along with a value stored in a Performance Control Register and a TPM Storage Root Key. The blob is stored in a non-volatile storage area of a computer.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
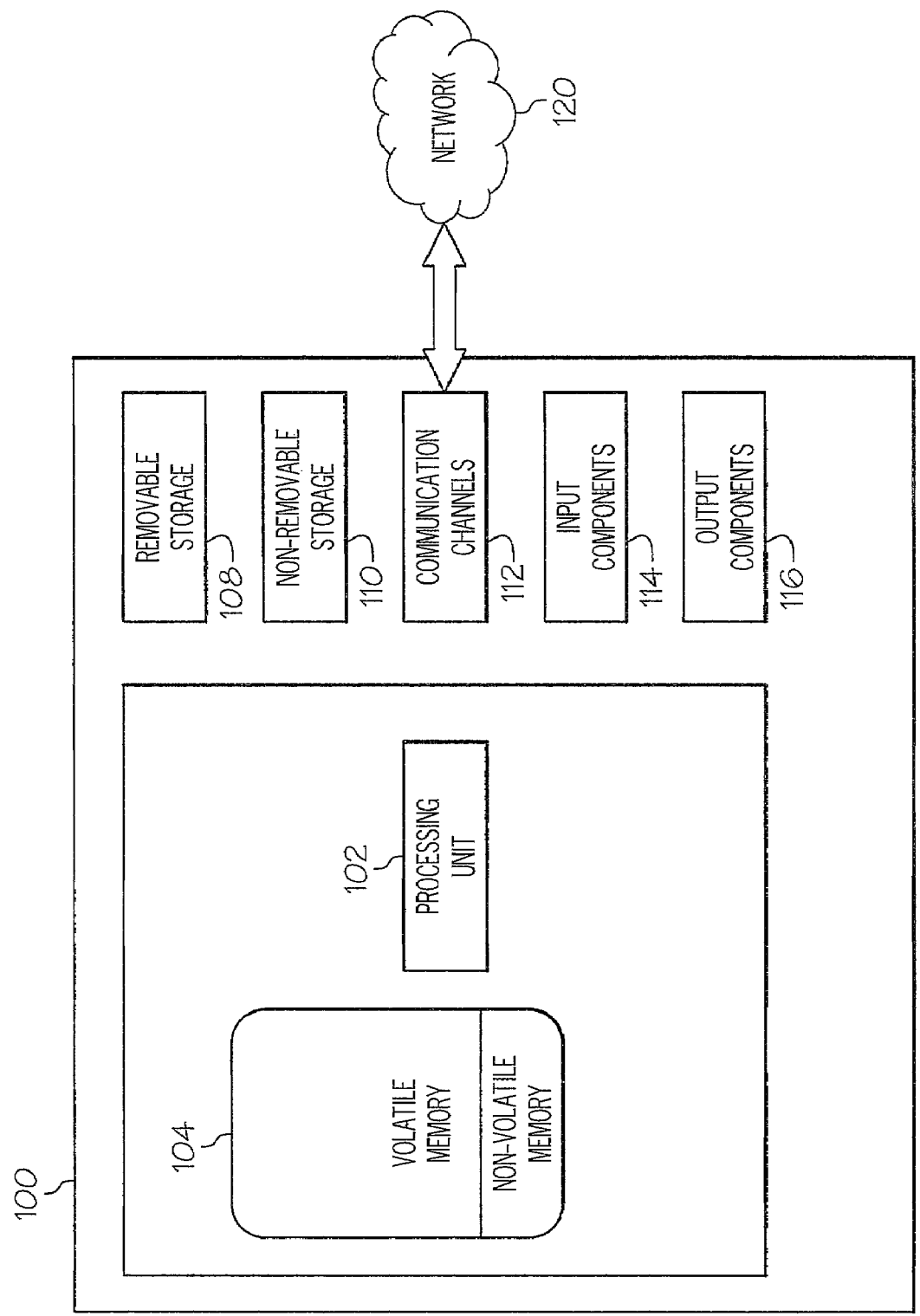
FIG. 1 is a block diagram of a computing device in which a preferred embodiment of the present invention is incorporated.

Referring now to the drawings and in particular to FIG. 1, there is depicted a block diagram of a computing device in which a preferred embodiment of the present invention is incorporated. As shown, a computing device 100 includes a processing unit 102 and a memory 104. Memory 104 includes a volatile memory (such as a random access memory) and a non-volatile memory (such as a read-only memory). Computing device 100 also contains removable storage media devices 108, such as compact discs, optical disks, magnetic tapes, etc., and non-removable storage devices 110, such as hard drives. In addition, computing device 100 may contain communication channels 112 for providing communications with other systems on a computer network 120. Computing device 100 also includes input components 114 such as a keyboard, mouse, etc., and output components 116 such as displays, speakers, printers, etc.

In accordance with a preferred embodiment of the present invention, a Trusted Platform Module (TPM) is used in conjunction with modifications to a basic input/output system (BIOS) for providing protection to an encryption key generated by the syskey utility intended to be used for the encryption of a Security Accounts Manager (SAM) file within a Windows® operating system. The TPM allows secure generation of cryptographic keys, and limits the use of those keys to either signing/verification or encryption/decryption, as it is known to those skilled in the art. There are three main components to the method of the present invention, namely, setup, boot up and recovery.

Setup Process

Figure 2:
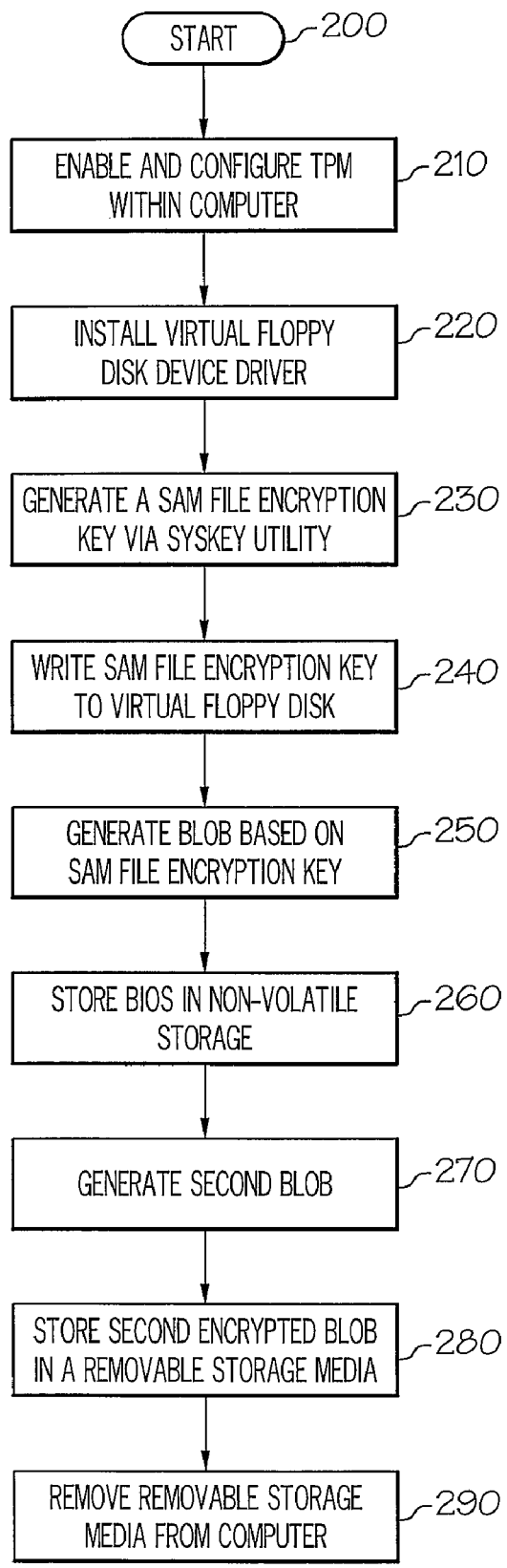
FIG. 2 is a high-level logic flow diagram of a method for setting up a computer for protecting a Security Accounts Manager (SAM) file within a Windows® operating system, in accordance with a preferred embodiment of the present invention.

With reference now to FIG. 2, there is depicted a high-level logic flow diagram of a method for setting up a computer for protecting a SAM file within a Windows® operating system, in accordance with a preferred embodiment of the present invention. Starting at block 200, a Trusted Platform Module (TPM) within the computer is enabled and configured using methods that are known to those skilled in the art, as shown in block 210. In addition, a virtual floppy disk device driver that emulates the presence of a physical floppy drive is installed, as depicted in block 220. Instead of requiring the presence of a physical floppy drive, the virtual floppy disk device driver basically causes the data to be written to a system memory.

A SAM file encryption key is generated by encrypting a SAM file with a 128-bit key (16 bytes) via the syskey utility provided within the Windows® operating system, as shown in block 230. The SAM file encryption key is then written to the virtual floppy disk (instead of a physical floppy disk) by selecting the option to store the SAM file encryption key to a floppy disk in the syskey utility, as depicted in block 240.

Next, a 256-byte blob is generated based on the SAM file encryption key, as shown in block 250. The 256-byte blob of data is generated by reading the SAM file encryption key from the virtual floppy disk and by performing a TPM Seal command against the SAM file encryption key along with the value stored in the register 0 of a Platform Configuration Register (PCR) and a TPM Storage Root Key (SRK). The 256-byte blob is then passed to the BIOS for storage in a non-volatile storage area of the computer, such as a flash memory or a hard disk drive, as depicted block 260.

Because the protection of the SAM file encryption key is tied to the TPM SRK, there must be a recovery mechanism for the SAM file encryption key in case the motherboard is replaced or the TPM security chip is cleared. For such purpose, the SAM file encryption key must also be encrypted via some other mechanism. Thus, the SAM file encryption key is encrypted using an Advanced Encryption Standard (AES) key derived from the administrator password within the Windows® operating system to generate a second encrypted blob, as shown in block 270. The second encrypted blob can be stored on a removable storage media, such as a floppy disk, a universal serial bus (USB) key, etc., as depicted in block 280. The removable storage media is then removed from the computer system, as shown in block 290.

Normal Boot Process

Figure 3:
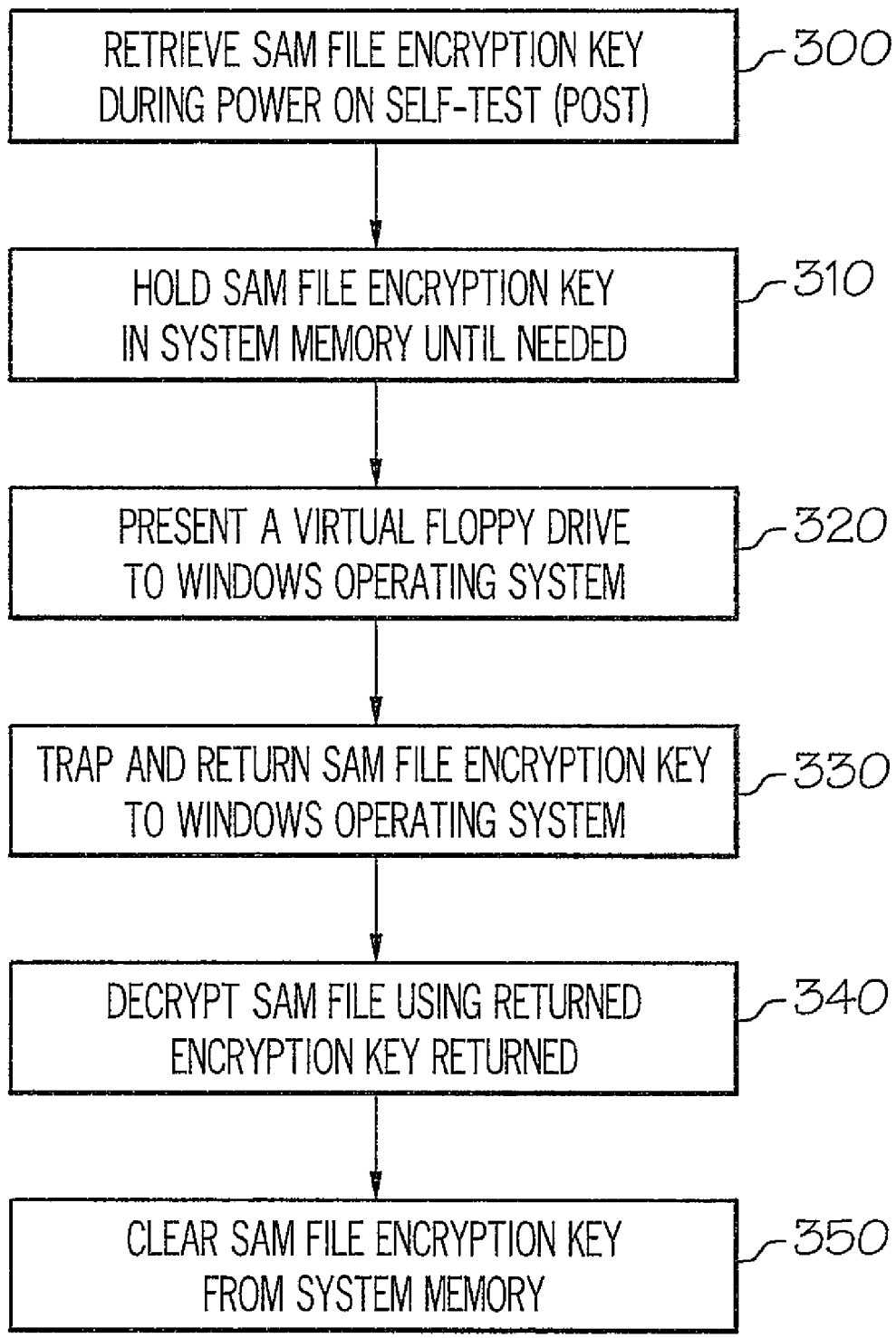
FIG. 3 is a high-level logic flow diagram of a method for performing a normal boot process after the setup process from FIG. 2 has been completed, in accordance with a preferred embodiment of the present invention.

Referring now to FIG. 3, there is shown a high-level logic flow diagram of a method of performing a system boot up after the setup process (from FIG. 2) has been completed, in accordance with a preferred embodiment of the present invention. A TPM Unseal command is performed on the 256-byte blob against the value of the register 0 within the PCR (i.e., PCR 0) to retrieve the SAM file encryption key during power on self-test (POST), as shown in block 300. This is performed when the BIOS comes out of the boot block. The BIOS holds the SAM file encryption key in the system memory until it is needed, as depicted in block 310.

When the SAM file encryption key is needed during the system boot up, the BIOS the "tricks" the Windows® operating system into thinking it is reading the SAM file encryption key from a physical floppy disk drive. To this end, an INT 13h handler is utilized to present a virtual floppy drive to the Windows® operating system, as shown in block 320. Once the BIOS knows that the computer is booting from the hard drive, the INT 13h handler then traps the read request number to the floppy disk drive, and returns the SAM file encryption key to the Windows® operating system, as depicted in block 330.

The Windows® operating system is now able to decrypt the SAM file using the encryption key returned by the BIOS, and the Windows® operating system is loaded and continues as normal, as shown in block 340. The SAM file encryption key is no longer needed by the BIOS so the SAM file encryption key should be cleared from the system memory, as depicted in block 350.

Recovery Process

Figure 4:
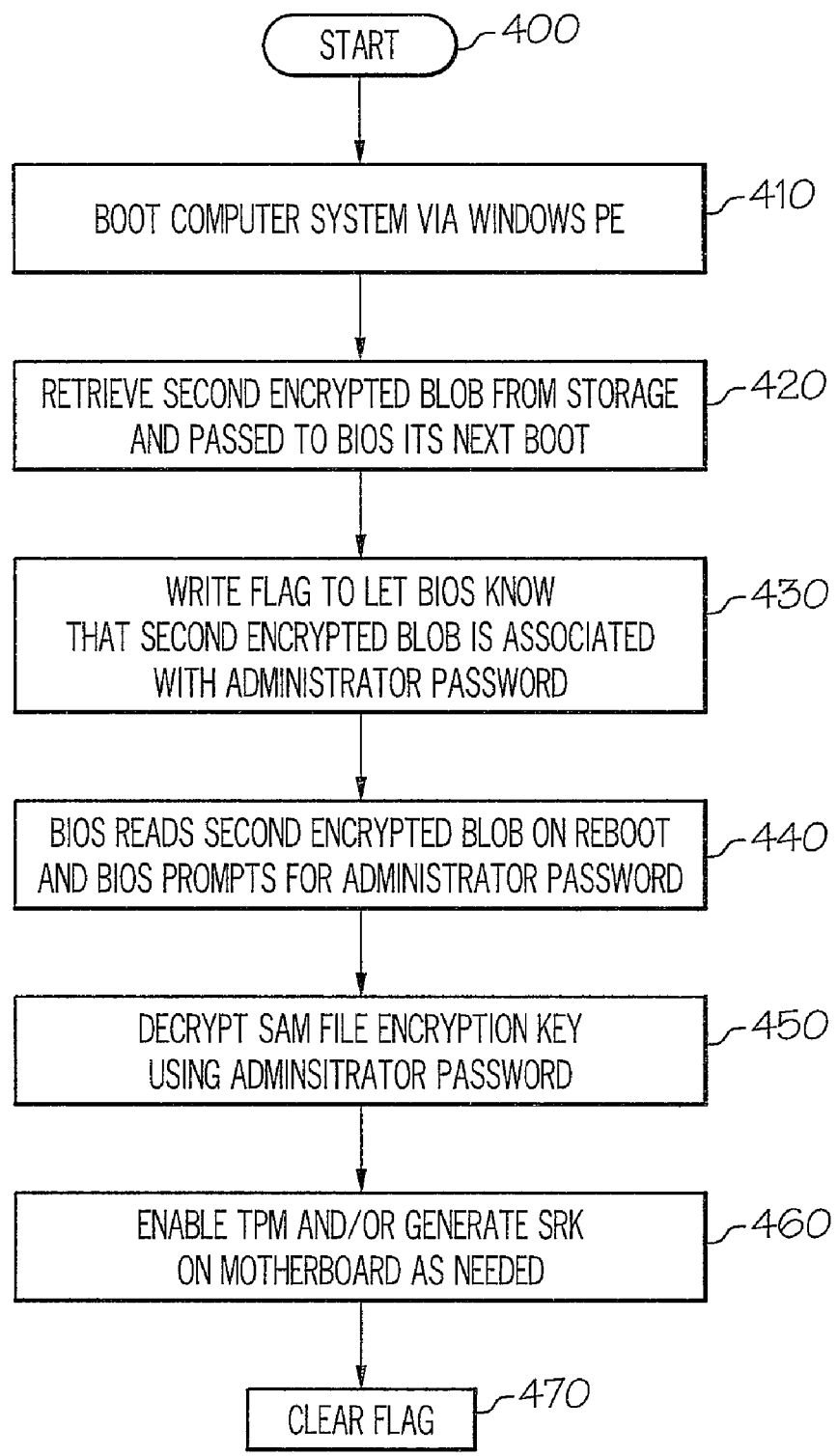
FIG. 4 is a high-level logic flow diagram of a method for booting a computer by using a backup key, in accordance with a preferred embodiment of the present invention.

With reference now to FIG. 4, there is depicted a high-level logic flow diagram of a method for performing a system boot up using the backup key, in accordance with a preferred embodiment of the present invention. Starting at block 400, an administrator, who would like to perform a system boot after a motherboard replacement, boots the computer system via Windows PE, as shown in block 410, which does not require the SAM file encryption key. From Windows PE, the second encrypted blob (i.e., copy of the SAM file encryption key that was encrypted by the administrator password in block 270 of FIG. 2) is retrieved from its storage location and passed to the BIOS for retrieval on its next boot, as depicted in block 420. A flag is also written to let the BIOS know that the second encrypted blob is associated with the administrator password and not the TPM, as shown in block 430.

On reboot, the BIOS reads the second encrypted blob, and since there is a flag indicating that the second encrypted key was encrypted with the administrator password, the BIOS prompts for the administrator password, as depicted in block 440. The administrator password is then used to decrypt the SAM file encryption key, as shown in block 450. The INT 13h handler subsequently passes the SAM file encryption key to the Windows® operating system as described in the normal boot process (blocks 320-330 of FIG. 2).

After the Windows® operating system has been loaded, the TPM recovery process is run to enable the TPM and/or generate the SRK on the motherboard as needed, as depicted in block 460. Once the new SRK has been generated, the recovery process under the Windows® operating system can either re-generate the file encryption key, or decrypt the archive version of the SAM file encryption key using the administrator password, and re-seal it to the new SRK as described above.

The flag indicating that the BIOS is using a password-encrypted version of the key (from block 430) should be cleared, as shown in block 470, so that the BIOS knows that it is using the TPM-protected version of the SAM file encryption key from this point on, so that the normal boot process can be executed during subsequent boots.

As has been described, the present invention provides an improved method for protecting a SAM file within a Windows® operating system. The present invention improves upon the current methods of protecting SAM files provided by the Windows® operating system.

It is also important to note that although the present invention has been described in the context of a fully functional computer system, those skilled in the art will appreciate that the mechanisms of the present invention are capable of being distributed as a program product in recordable type media such as compact discs.

While the invention has been particularly shown and described with reference to a preferred embodiment, it will be understood by those skilled in the art that various changes in form and detail may be made therein without departing from the spirit and scope of the invention.

What is claimed is:

1. A method for protecting a Security Accounts Manager (SAM) file within a Windows® operating system, said method comprising:

generating a SAM file encryption key by encrypting a SAM file via a syskey utility provided within said Windows® operating system;

storing said SAM file encryption key to a virtual floppy disk by selecting an option to store SAM file encryption key to a floppy disk under said syskey utility;

generating a blob based on said SAM file encryption key, wherein said blob is generated by performing a Trusted Platform Module (TPM) Seal command against said SAM file encryption key along with a value stored in a Performance Control Register and a TPM Storage Root Key; and storing said blob in a non-volatile storage device of a computer;

retrieving said SAM file encryption key during Power On Self-Test by performing a TPM Unseal command on said blob against said value of stored in said Performance Control Register, wherein retrieving said SAM file encryption key includes tricking said Windows® operating system to read from said virtual floppy disk instead of a physical floppy disk by trapping a read request number to a floppy drive; and providing said SAM file encryption key to said Windows® operating system during system boot up via interrupt handler.

2. The method of claim 1, wherein said method further includes providing a TPM within said computer.

3. The method of claim 2, wherein said method further includes providing a virtual floppy disk device driver within said computer.

4. The method of claim 1, wherein said method further includes generating a backup blob by encrypting said SAM file encryption key via an Advanced Encryption Standard key derived from an administrator password; and storing said backup blob in a removable storage medium.

5. A non-transitory computer recordable medium having a computer program product for protecting Security Accounts Manager (SAM) files within a Windows® operating system, said computer recordable medium comprising:

program code for generating a SAM file encryption key by encrypting a SAM file via a syskey utility provided within said Windows® operating system;

program code for storing said SAM file encryption key to a virtual floppy disk by selecting an option to store SAM file encryption key to a floppy disk under said syskey utility;

program code for generating a blob based on said SAM file encryption key, wherein said blob is generated by performing a Trusted Platform Module (TPM) Seal command against said SAM file encryption key along with a value stored in a Performance Control Register and a TPM Storage Root Key; and program code for storing said blob in a non-volatile storage device of a computer, program code for retrieving said SAM file encryption key during Power On Self-Test by performing a TPM Unseal command on said blob against said value of stored in said Performance Control Register, wherein retrieving said SAM file encryption key includes tricking said Windows® operating system to read from said virtual floppy disk instead of a physical floppy disk by trapping a read request number to a floppy drive; and program code for providing said SAM file encryption key to said Windows® operating system during system boot up via interrupt handler.

6. The computer recordable medium of claim 5, wherein said computer recordable medium further includes program code for initiating said TPM Seal command within said computer.

7. The computer recordable medium of claim 6, wherein said computer recordable medium further includes program code for providing a virtual floppy disk device driver within said computer.

8. The computer recordable medium of claim 5, wherein said computer recordable medium further includes program code for generating a backup blob by encrypting said SAM file encryption key via an Advanced Encryption Standard key derived from an administrator password; and program code for storing said backup blob in a removable storage medium.

9. A computer system capable of protecting Security Accounts Manager (SAM) files within a Windows® operating systems, said computer system comprising:

a SAM file encryption key generated by encrypting a SAM file via a syskey utility provided within said Windows® operating system;

a volatile storage device having a virtual floppy disk for storing said SAM file encryption key by selecting an option to store SAM file encryption key to a floppy disk under said syskey utility; and a non-volatile storage device for storing a blob generated based on said SAM file encryption key, wherein said blob is generated by performing a Trusted Platform Module (TPM) Seal command against said SAM file encryption key along with a value stored in a Performance Control Register and a TPM Storage Root Key;

a processor for retrieving said SAM file encryption key during Power On Self-Test by performing a TPM Unseal command on said blob against said value of stored in said Performance Control Register, wherein retrieving said SAM file encryption key includes tricking said Windows® operating system to read from said virtual floppy disk instead of a physical floppy disk by trapping a read request number to a floppy drive; and an interrupt handler for providing said SAM file encryption key to said Windows® operating system during system boot.

10. The computer system of claim 9, wherein said computer system further includes a TPM.

11. The computer system of claim 10, wherein said computer system further includes virtual floppy disk device driver.

12. The computer system of claim 9, wherein said computer system further includes an Advanced Encryption Standard key derived from an administrator password for encrypting said SAM file encryption key to generate a backup blob; and a removable storage medium for storing said backup blob.

* * * * *